United States Patent Office 3,739,010
Patented June 12, 1973

---

3,739,010
CHLORINATION PROCESS
Eijiro Suzuki, Hyogo, and Ryuzo Kimoto, Kazuo Imaoka, and Kojiro Umemoto, Osaka, Japan, assignors to Takeda Chemical Industries, Ltd., Higashi-ku, Osaka, Japan
No Drawing. Filed Sept. 13, 1971, Ser. No. 180,136
Claims priority, application Japan, Sept. 18, 1970, 45/82,222
Int. Cl. C07c *121/02*
U.S. Cl. 260—465.7     3 Claims

ABSTRACT OF THE DISCLOSURE

Methacrylonitrile is reacted with chlorine in the gas phase at an elevated temperature and in the presence of water vapor to produce 3-chloro-2-cyanopropene and 1,3-dichloro-2-cyanopropene. The objective compounds are useful as intermediates for the synthesis of medicines and industrial chemicals.

---

This invention relates to a chlorination process, and more particularly to a method for the chlorination of methacrylonitrile at an elevated temperature to yield mono- or dichlorinated derivatives thereof.

The method comprises reacting methacrylonitrile with chlorine in the gas phase at an elevated temperature in the presence of water vapor whereby 3-chloro-2-cyanopropene and 1,3-dichloro-2-cyanopropene are produced which are useful as intermediates for the synthesis of medicines and industrial chemicals.

It is well known that reaction between methacrylonitrile and chlorine often causes explosion and combustion, and therefore in known methods for the production of chlorinated derivatives of methacrylonitrile by reaction of chlorine and methacrylonitrile, a large excess amount of methacrylonitrile is allowed to react with chlorine in order to prevent explosion and combustion. However, the said known methods are accompanied with fatal defects; that is to say, a large amount of methacrylonitrile remains unreacted and therefore yield of the object compounds is very low in regard to methacrylonitrile; hydrogen chloride produced by the desired main reactions as described below

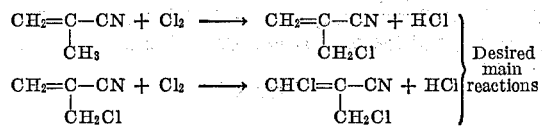

further reacts not only with the starting material, methacrylonitrile, but also with the object compounds (i.e. 3-chloro-2-cyanopropene, 1,3-dichloro-2-cyanopropene) to produce undesirable by-products, these undesirable reactions being shown as follows

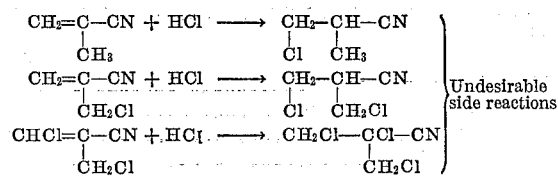

and, thus, also these side reactions lower the yield of the object compounds. Further, during the reaction, there are produced tar like materials, which stick on a reaction apparatus to such an extent that the apparatus is closed completely, and therefore it is impossible to conduct the reaction for a long period of time.

The present invention is based upon the finding that, when the gas-phase reaction between chlorine and methacrylonitrile is conducted in the presence of water vapor, the object chlorinated products can be obtained in a high yield without producing a large amount of by-products and without closing the apparatus with tar like materials, even when the ratio of methacrylonitrile/chlorine to be introduced in a reaction system is not so high.

This finding is quite unexpected to one skilled in the art. Methacrylonitrile is very reactive because of the nitrile group and active double bond and thus, if methacrylonitrile is contacted with chlorine in the presence of water vapor, it would be reasonable supposition to one skilled in the art that a large amount of methacrylonitrile would be decomposed or hydrolyzed by the action of water vapor and hydrogen chloride which is by-produced by reaction of methacrylonitrile and chlorine; and therefore that the yield of the object compounds would be extremely lowered by this decomposition or hydrolysis. The present invention is based upon the further finding that the above-mentioned unexpected results obtained with water vapor cannot be attained by use of other inert gas (e.g., nitrogen gas).

The present invention is based upon these unexpected findings. The principal and essential object of the present invention is to provide an improved method for the production of 3-chloro-2-cyanopropene and 1,3-dichloro-2-cyanopropene, by which the object compounds can be produced in high yield without producing a large amount of by-products and without closing a reaction apparatus with tar like materials.

This object can be accomplished by reacting methacrylonitrile with chlorine in gas phase at an elevated temperature in the presence of water vapor.

The molar ratio of chlorine to methacrylonitrile which are contacted with each other is in the range of 0.6/1 to 1.3/1, preferably 0.7/1 to 0.9/1, and water vapor is used in the range of 0.6 to 1.0 mole preferably 0.7 to 0.9 mole per mole of methacrylonitrile. The best result is obtained in a molar ratio of methacrylonitrile:water vapor:chlorine of around 1.0:0.8:0.8.

The reaction temperature is preferably maintained at 400° to 550° C., more preferably 460° to 510° C., and the best result is obtained around 480° C. It is recommended that the starting materials (methacrylonitrile and chlorine) and water are respectively heated at higher than the boiling point and thus produced gaseous starting materials and water vapor are fed to a reactor. As a reactor, a vertical tubular one is desirably employed, and the gaseous materials and water vapor are co-currently fed to the tubular reactor from the upper portion thereof.

Though the reaction time varies with other reaction conditions, it is usually in the range of 0.1 to 1.0 second, and the best result is obtained when the reaction time is about 0.4 to about 0.7 second. The reaction pressure may be atmospheric pressure, but the reaction at an elevated pressure such as 0.2 to 2.0 kg./cm.$^2$ g. is preferable.

By this reaction, 3-chloro-2-cyanopropene and 1,3-dichloro-2-cyanopropene are produced, and a ratio of these two compounds varies with the reaction conditions such as reaction temperature, a molar ratio of chlorine gas to methacrylonitrile, and reaction time. Generally stated, high temperature, high molar ratio of chlorine gas to methacrylonitrile and long reaction time give high amount of formation of 1,3-dichloro-2-cyanopropene.

After the reaction is over, the reaction mixture is cooled preferably by spraying water. When the gaseous starting materials and water vapor are fed to a vertical tubular reactor from the upper portion thereof, water is sprayed into the reactor from the bottom portion thereof. When water is used in order to cool the reaction mixture, the by-produced hydrogen chloride is absorbed into water to give aqueous hydrochloric acid solution. Water is used preferably in such an amount that concentration of the resulting aqueous hydrochloric acid solution becomes 25% or less.

The thus cooled reaction mixture consists of two distinct layers, i.e. the lower layer comprising an aqueous hydrochloric acid solution and the upper organic layer containing the object compounds. The organic layer is recovered and purified by a conventional manner, for example, fractional distillation. When fractional distillation is employed, methacrylonitrile can be recovered as a fraction boiling up to 91° C. at atmospheric pressure, 3-chloro-2-cyanopropene can be recovered as a fraction boiling at 50° to 67° C./15 mm. Hg, and 1,3-dichloro-2-cyanopropene can be obtained as a fraction boiling at 60° to 80° C./10 mm. Hg.

The resulting products can be used, for example, for the production of vitamin $B_1$ according to the following steps:

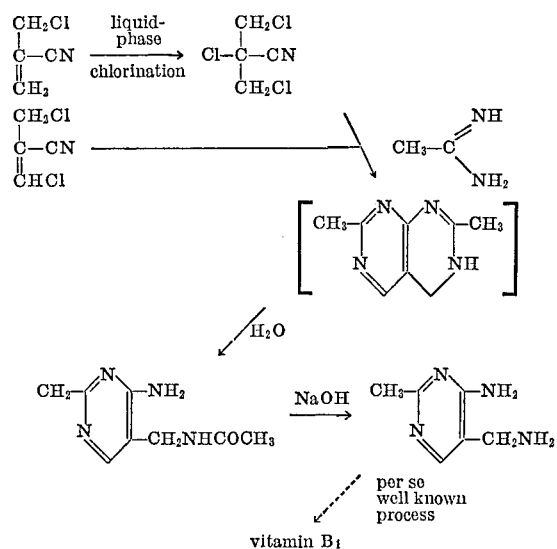

vitamin $B_1$

Concrete description for conducting the above-illustrated process is found, for example, in the following literature references:

U.S. patent application No. 148,147, filed May 28, 1971.
U.S. Pat. No. 3,472,850.
U.S patent application No 859,554, filed Sept. 19, 1969.
Japanese patent publication No. 3,976/1957.

This invention will be further described in detail in the following examples. The term "reaction yield" means the mole percent of the desired products relative to the whole methacrylonitrile fed to the reaction system, and the term "selectivity" means mole percent of the desired products relative to the actually consumed methacrylonitrile i.e. (methacrylonitrile fed to the reaction system) minus (methacrylonitrile remaining unreacted).

EXAMPLE 1

A tubular reactor of stainless steel, 25 mm. in inside diameter and 1,000 mm. long, is preheated to 400° C. By means of a constant feed pump, 1,340 g./hr. of methacrylonitrile is fed into an evaporator and, simultaneously, 288 g./hr. of water is introduced into the evaporator via a constant feed pump. The resulting mixture of methacrylonitrile and water vapor is heated in a tubular pre-heater to 250° C. before being fed into the reactor. On the other hand 1,136 g./hr. of chlorine gas is fed from a bomb to the tubular reactor via a flow rate controller, whereupon the reaction takes place. The internal temperature of the reactor is kept at 450°–500° C. by external heat- ing. At the exit end of the tubular reactor, the reaction mixture is rapidly cooled by spraying with 1,440 g./hr. of water, whereupon the by-product hydrogen chloride is absorbed. The whole reaction mixture is then led to a collector. During the above process, the reaction system is kept under pressure of about 0.2 kg./cm.$^2$ g. After the above process is conducted for 1 hour, the reaction mixture in the collector is allowed to separate into two layers; 2,272 g. of an aqueous hydrochloric acid solution and 1,928 g. of an organic layer. The organic layer is fractionally distilled to obtain:

| | G. |
|---|---|
| 3-chloro-2-cyanopropene | 763 |
| 1,3-dichloro-2-cyanopropane | Trace |
| 1,3-dichloro-2-cyanopropene | 440 |
| Methacrylonitrile | 423 |

The reaction yields of 3-chloro-2-cyanopropene and 1,3-dichloro-2-cyanopropene are 37.6% and 16.1%, respectively, and the selectivities are 54% and 24%, respectively.

Reference 1

By means of a metering pump, 1,340 g./hr. of a methacrylonitrile is fed into an evaporator and, simultaneously, 220 g./hr. of nitrogen gas is introduced into the evaporator via a constant feed pump. The resulting mixture of methacrylonitrile and nitrogen vapor is heated at 300° C. in a tubular pre-heater and introduced into a tubular reactor of stainless steel (16 mm. in inside diameter and 1,000 mm. long). On the other hand, 1,136 g./hr. of chlorine gas is fed from a bomb to the tubular reactor via a flow rate controller, whereupon the reaction takes place. The internal temperature of the reactor is kept at 450° C. During the above process, the reaction system is kept under pressure of about 2.0 kg./cm.$^2$ g. The reaction mixture is led to a tank which is cooled by means of Dry Ice-acetone, whereupon methacrylonitrile and the chlorinated products are condensed, while nitrogen gas and hydrogen chloride are purged. After the above process is conducted for 1 hour, the condensate is fractionally distilled to obtain:

| | G. |
|---|---|
| 3-chloro-2-cyanopropene | 630 |
| 1,3-dichloro-2-cyanopropene | 445 |
| 1,3-dichloro-2-cyanopropane | 110 |
| 1-chloro-2-cyanopropane | 48 |
| Methacrylonitrile | 288 |

The reaction yields of 3-chloro-2-cyanopropene and 1,3-dichloro-2-cyanopropene are 31.0% and 16.3%, respectively, and the selectivities are 39.5% and 20.2%, respectively.

Reference 2

The reaction is conducted by using a stainless steel tubular column (16 mm. in inside diameter and 1,000 mm. long) in a similar manner to Example 1, except that water vapor is not used. After the reaction is conducted for 1 hour, the reaction mixture is allowed to separate into distilled layers; an aqueous hydrochloric acid solution and an organic layer. The organic layer is fractionally distilled to obtain:

| | G. |
|---|---|
| 3-chloro-2-cyanopropene | 552 |
| 1,3-dichloro-2-cyanopropane | 141 |
| 1,3-dichloro-2-cyanopropene | 149.5 |
| Methacrylonitrile | 548 |

The reaction yields of 3-chloro-2-cyanopropene and 1,3-dichloro-2-cyanopropene are 25.7% and 5.5%, respectively, and the selectivities are 45.5% and 9.7%, respectively.

What is claimed is:

1. A process for the production of a mixture of 3-chloro-2-cyanopropene and 1,3 - dichloro-2-cyanopropene which comprises reacting methacrylonitrile with elemental chlorine in gas phase at a temperature of 400° to 550° C. in the presence of water vapor, the molar ratio of methacrylonitrile:elemental chlorine gas:water vapor being 1:0.6–1.3:0.6–1.0.

2. A process according to claim 1 wherein the reaction time is 0.1 to 1.0 second and the reaction pressure is between atmospheric and 0.2 to 2.0 kg./cm.$^2$.

3. A process according to claim 1, wherein the reaction is conducted around 480° C.

References Cited

UNITED STATES PATENTS

| | | | |
|---|---|---|---|
| 3,627,765 | 12/1971 | Tsurushima | 260—465.7 |
| 2,466,641 | 4/1949 | Hearne et al. | 260—465.7 |

OTHER REFERENCES

N.V. de Bataafsche; C. A., vol. 45 (1951), pp. 174–175.

JOSEPH P. BRUST, Primary Examiner